(12) United States Patent
Tirronen et al.

(10) Patent No.: US 10,111,201 B2
(45) Date of Patent: Oct. 23, 2018

(54) WIRELESS COMMUNICATION DEVICE, CORE NETWORK NODE AND METHODS THEREIN FOR EXTENDED DRX PAGING CYCLE

(71) Applicant: Telefonaktiebolaget LM Ericsson (publ), Stockholm (SE)

(72) Inventors: Tuomas Tirronen, Helsinki (FI); Yufei Blankenship, Kildeer, IL (US); Andreas Höglund, Solna (SE); Paul Schliwa-Bertling, Ljungsbro (SE)

(73) Assignee: Telefonaktiebolaget LM Ericsson (publ.), Stockholm (SE)

( * ) Notice: Subject to any disclaimer, the term of this patent is extended or adjusted under 35 U.S.C. 154(b) by 0 days.

(21) Appl. No.: 15/539,959

(22) PCT Filed: Jan. 16, 2015

(86) PCT No.: PCT/SE2015/050039
§ 371 (c)(1),
(2) Date: Jun. 26, 2017

(87) PCT Pub. No.: WO2016/114698
PCT Pub. Date: Jul. 21, 2016

(65) Prior Publication Data
US 2017/0374645 A1    Dec. 28, 2017

(51) Int. Cl.
*H04W 68/02*    (2009.01)
*H04W 52/02*    (2009.01)
(Continued)

(52) U.S. Cl.
CPC ....... *H04W 68/02* (2013.01); *H04W 52/0216* (2013.01); *H04W 52/0219* (2013.01);
(Continued)

(58) Field of Classification Search
CPC ............. H04W 52/02; H04W 52/0203; H04W 52/0225; H04W 52/0235; H04W 52/28;
(Continued)

(56) References Cited

U.S. PATENT DOCUMENTS 9,294,714 B2 *   3/2016   Gupta ................... H04N 7/141
9,398,532 B2 *   7/2016   Hsu ................... H04W 52/0225
(Continued)

FOREIGN PATENT DOCUMENTS

WO    2014168537 A1    10/2014
WO    2014185538 A1    11/2014

OTHER PUBLICATIONS

International Search Report and Written Opinion dated Oct. 2, 2015 for International Application Serial No. PCT/SE2015/050039, International Filing Date: Jan. 16, 2015 consisting of 12-pages.
(Continued)

*Primary Examiner* — Meless Zewdu
(74) *Attorney, Agent, or Firm* — Sage Patent Group

(57) ABSTRACT

A method in a wireless communication device for handling an extended paging cycle. The extended paging cycle is used for receiving a paging message from a core network node. The extended paging cycle is longer than a frame number range of the wireless communications network. The wireless communication device obtains a parameter related to a length of the extended paging cycle. The wireless communication device obtains an information about when the wireless communication device has entered an idle mode. The wireless communication device determines a time period when the wireless communication device is to monitor for the paging message. The determining is based on the parameter related to the length of the extended paging cycle and based on the information about when the wireless communication device has entered the idle mode.

16 Claims, 9 Drawing Sheets

(51) Int. Cl.
*H04W 68/00* (2009.01)
*H04W 4/70* (2018.01)

(52) U.S. Cl.
CPC ............ *H04W 68/005* (2013.01); *H04W 4/70* (2018.02); *Y02D 70/00* (2018.01); *Y02D 70/1242* (2018.01); *Y02D 70/1262* (2018.01); *Y02D 70/1264* (2018.01); *Y02D 70/146* (2018.01); *Y02D 70/21* (2018.01); *Y02D 70/24* (2018.01)

(58) Field of Classification Search
CPC ... H04W 68/00; H04W 68/02; H04W 68/025; H04W 76/046; H04W 76/048; H04W 40/005; H04W 84/02; H04W 84/027; H04W 88/02; H04W 88/04; H04W 4/02; H04W 52/0219; H04W 52/0216; H04W 68/005; H04W 4/70; H04W 4/00; H04W 52/00; H04W 52/0209; H04W 72/0446; Y02D 70/1262; Y02D 70/1242; Y02D 70/1264; Y02D 70/21; Y02D 70/146; Y02D 70/00; Y02D 70/24; H04L 1/0007
See application file for complete search history.

(56) References Cited

U.S. PATENT DOCUMENTS

| | | | |
|---|---|---|---|
| 9,763,235 B2 * | 9/2017 | Vannithamby | H04L 65/1016 |
| 2010/0184458 A1 * | 7/2010 | Fodor | H04W 52/0216 455/522 |
| 2013/0301501 A1 | 11/2013 | Olvera-Hernandez et al. | |
| 2014/0185512 A1 * | 7/2014 | Jacob | H04W 52/0229 370/311 |
| 2014/0323165 A1 * | 10/2014 | Diachina | H04W 68/02 455/458 |
| 2015/0223198 A1 * | 8/2015 | Du | H04W 52/0203 455/458 |
| 2015/0327215 A1 * | 11/2015 | Xu | H04W 68/005 455/435.1 |
| 2016/0029344 A1 * | 1/2016 | Vannithamby | H04W 68/02 455/458 |
| 2016/0029434 A1 * | 1/2016 | Qiu | H04W 4/005 370/311 |
| 2016/0044578 A1 * | 2/2016 | Vajapeyam | H04W 52/0216 370/252 |
| 2016/0044632 A1 * | 2/2016 | Liang | H04W 52/0216 455/426.1 |
| 2016/0050626 A1 * | 2/2016 | Chen | H04W 52/0225 370/311 |
| 2016/0057701 A1 * | 2/2016 | Choi | H04W 76/28 370/311 |
| 2016/0112948 A1 * | 4/2016 | Liang | H04W 52/0216 370/311 |

OTHER PUBLICATIONS

3GPP TS 36.304 V12.1.0, Title: "Technical Specification Group Radio Access Network; Evolved Universal Terrestrial Radio Access (E-UTRA); User Equipment (UE) procedures in idle mode (Release 12)," 650 Route des Lucioles—Sophia Antipolis, Jun. 2014, Valbonne—France, consisting of 35-pages.

3GPP TS 24.301 V13.0.0, Title: "Technical Specification Group Core Network and Terminals; Non-Access-Stratum (NAS) protocol for Evolved Packet System (EPS); Stage 3 (Release 13)," 650 Route des Lucioles—Sophia Antipolis, Dec. 2014, Valbonne—France, consisting of 374-pages.

* cited by examiner

WIRELESS COMMUNICATION DEVICE, CORE NETWORK NODE AND METHODS THEREIN FOR EXTENDED DRX PAGING CYCLE

CROSS-REFERENCE TO RELATED APPLICATION

This application is a Submission Under 35 U.S.C. § 371 for U.S. National Stage Patent Application of International Application Number: PCT/SE2015/050039, filed Jan. 16, 2015 entitled "A WIRELESS COMMUNICATION DEVICE, A CORE NETWORK NODE AND METHODS THEREIN, FOR EXTENDED DRX PAGING CYCLE," the entirety of which is incorporated herein by reference.

TECHNICAL FIELD

Embodiments herein relate to a wireless communication device, a core network node and methods therein for handling an extended paging cycle in a wireless communications system. In particular they relate to determining a paging occasion when using extended paging cycles longer than a frame number range.

BACKGROUND

In a typical radio communications network, wireless communication devices, also known as mobile stations and/or user equipments (UEs), communicate via a Radio Access Network (RAN) to one or more Core Networks (CN). The radio access network covers a geographical area which is divided into cell areas, with each cell area being served by a base station, e.g., a radio base station (RBS), which in some networks may also be called, for example, a "NodeB" or "eNodeB". A cell is a geographical area where radio coverage is provided by the radio base station at a base station site or an antenna site in case the antenna and the radio base station are not collocated. Each cell is identified by an identity within the local radio area, which is broadcast in the cell. Another identity identifying the cell uniquely in the whole mobile network is also broadcasted in the cell. One base station may have one or more cells. A cell may be downlink and/or uplink cell. The base stations communicate over the air interface operating on radio frequencies with the user equipments within range of the base stations.

A Universal Mobile Telecommunications System (UMTS) is a third generation mobile communication system, which evolved from the second generation (2G) Global System for Mobile Communications (GSM). The UMTS terrestrial radio access network (UTRAN) is essentially a RAN using wideband code division multiple access (WCDMA) and/or High Speed Packet Access (HSPA) for user equipments. In a forum known as the Third Generation Partnership Project (3GPP), telecommunications suppliers propose and agree upon standards for third generation networks and UTRAN specifically, and investigate enhanced data rate and radio capacity. In some versions of the RAN as e.g. in UMTS, several base stations may be connected, e.g., by landlines or microwave, to a controller node, such as a radio network controller (RNC) or a base station controller (BSC), which supervises and coordinates various activities of the plural base stations connected thereto. The RNCs are typically connected to one or more core networks.

Specifications for the Evolved Packet System (EPS) have been completed within the 3rd Generation Partnership Project (3GPP) and this work continues in the coming 3GPP releases. The EPS comprises the Evolved Universal Terrestrial Radio Access Network (E-UTRAN), also known as the Long Term Evolution (LTE) radio access, and the Evolved Packet Core (EPC), also known as System Architecture Evolution (SAE) core network. E-UTRAN/LTE is a variant of a 3GPP radio access technology wherein the radio base station nodes are directly connected to the EPC core network rather than to RNCs. In LTE the base station nodes are for example directly connected to Mobility Management Entities (MME). The MME is responsible for idle mode UE tracking and paging procedure including retransmissions. In general, in E-UTRAN/LTE the functions of a RNC are distributed between the radio base stations nodes, e.g. eNodeBs in LTE, and the core network. As such, the Radio Access Network (RAN) of an EPS has an essentially "flat" architecture comprising radio base station nodes without reporting to RNCs.

Machine Type Communications (MTC) is an area within telecommunications, sometimes also referred to as M2M or Internet of Things (IoT), in which it is envisioned that all types of devices which may potentially benefit from communicating will do so. That is, everything from agriculture and/or industrial sensors and actuators to things in the smart home or workout gauges in the personal networks will be connected wirelessly. Many devices may not, like a smart phone, be charged frequently and therefore it is beneficial if many of the MTC wireless communication devices, or UEs, try to conserve energy and power by sleeping as much as possible, i.e., having as much of their circuitry turned off as much as possible. In wireless communications networks, such as in 3GPP LTE networks, the UEs may save power by a discontinuous reception (DRX) mechanism. During DRX the UE may keep its receiver circuitry powered off to save power, but during a DRX sleep the network may not reach the UE to inform it about incoming data traffic, system information updates, etc.

When the network tries to send data traffic to the UE, the network uses a paging procedure, where a paging message is sent from the Core Network (CN) through the base station to the UE. The UE is expected to listen to the paging channel at certain time instants which are calculated using UE identification number (IMSI) and the current System Frame Number (SFN) in the cell. For a UE in idle mode this procedure is specified in 3GPP TS 36.304. In LTE, the SFN denotes a radio frame, which is 10 ms in length, comprising 10 subframes. The available SFN number goes from 0 to 1023. The full SFN cycle length is 10.24 seconds, therefore the SFN wraps around every 10.24 seconds in each cell. The UE should be awake at least during one paging occasion during a DRX cycle so the network paging message may reach the UE. The paging occasion is defined as the subframe during which the UE shall monitor the paging message. The paging occasion and Paging Frame (PF) is determined based on the length of the DRX cycle of the UE and based on an identification of the UE, such as a UE ID in LTE.

When a UE wakes up in a cell and does not know the downlink timing of the radio frames, the subframes and the symbols, it needs to obtain synchronization to the network first. There are different technology dependent ways to achieve these synchronizations. In LTE, in order to calculate the paging frame and the paging occasion the SFN synchronization is obtained. This may be achieved by reading the broadcasted Master Information Block (MIB) which includes information on the current SFN. If the UE sleeps for a very long period, its internal clock may experience clock drift large enough to require the UE to read the MIB again after the UE has woken up.

In the current LTE system the paging cycle length is at most 2.56 seconds. There is incentive to extend this cycle length in order to save more power especially for MTC UEs.

If the DRX cycle length or the paging cycle length of the UEs is extended beyond the SFN range, the current procedures of determining the paging occasion are not applicable any more.

Moreover, the SFN is not synchronized across different cells. Thus, if the UE moves to another cell while it is sleeping, this will also lead to problems related to the calculation of the correct wake-up time for paging, especially if the maximum paging cycle is extended.

SUMMARY

It is therefore an object of embodiments herein to provide an improved way of handling an extended paging cycle.

In brief, the object is achieved since the wireless communication device and the core network node keep track of the timing until next paging.

According to a first aspect of embodiments herein, the object is achieved by a method in a wireless communication device for handling an extended paging cycle. The extended paging cycle is used for receiving a paging message from a core network node comprised in a wireless communications network. The extended paging cycle is longer than a frame number range of the wireless communications network.

The wireless communication device obtains a parameter related to a length of the extended paging cycle.

The wireless communication device further obtains an information about when the wireless communication device has entered an idle mode. The idle mode is related to a connection between the wireless communication device and the core network node.

The wireless communication device determines a time period when the wireless communication device is to monitor for the paging message. The determining is based on the parameter related to the length of the extended paging cycle and based on the information about when the wireless communication device has entered the idle mode.

According to a second aspect of embodiments herein, the object is achieved by a wireless communication device configured to handle an extended paging cycle. The extended paging cycle is used for receiving a paging message from a core network node comprised in a wireless communications network. The extended paging cycle is longer than a frame number range of the wireless communications network.

The wireless communication device is configured to obtain a parameter related to a length of the extended paging cycle.

The wireless communication device is further configured to obtain an information about when the wireless communication device has entered an idle mode. The idle mode is related to a connection between the wireless communication device and the core network node.

The wireless communication device is configured to determine a time period when the wireless communication device is to monitor for the paging message. The determining is based on the parameter related to the length of the extended paging cycle and based on the information about when the wireless communication device has entered the idle mode.

According to a third aspect of embodiments herein, the object is achieved by a method in a core network node for handling an extended paging cycle. The extended paging cycle is used by a wireless communication device for receiving a paging message from the core network node comprised in a wireless communications network. The extended paging cycle is longer than a frame number range of the wireless communications network.

The core network node determines a parameter related to a length of the extended paging cycle.

The core network node further obtains information about when the wireless communication device has entered an idle mode. The idle mode is related to a connection between the wireless communication device and the core network node.

The core network node determines a time period when the wireless communication device is to monitor for the paging message, based on the parameter related to the length of the extended paging cycle and based on the obtained information about when the wireless communication device has entered the idle mode.

According to a fourth aspect of embodiments herein, the object is achieved by a core network node configured for handling an extended paging cycle. The extended paging cycle is used by a wireless communication device for receiving a paging message from the core network node comprised in a wireless communications network. The extended paging cycle is longer than a frame number range of the wireless communications network.

The core network node is configured to determine a parameter related to a length of the extended paging cycle.

The core network node is configured to obtain information about when the wireless communication device has entered an idle mode. The idle mode is related to a connection between the wireless communication device and the core network node.

The core network node is further configured to determine a time period when the wireless communication device is to monitor for the paging message, based on the parameter related to the length of the extended paging cycle and based on the obtained information about when the wireless communication device has entered the idle mode.

Since the wireless communication device determines a time period for monitoring the paging message based on the parameter related to the length of the extended paging cycle and based on the information about when the wireless communication device has entered the idle mode, the wireless communication device is able to handle the extended paging cycle.

An advantage with embodiments herein is that they support paging for wireless communication devices which follow longer paging cycles without impacting the paging message transmission on the radio access network.

Longer paging cycles enable significant power saving gains for wireless communication devices, such as UEs.

The wireless communication devices may be paged on different cells which do not have synchronized SFN, since the wireless communication device and the core network node keep track of the timing until next paging.

BRIEF DESCRIPTION OF THE DRAWINGS

Examples of embodiments herein are described in more detail with reference to attached drawings in which.

DETAILED DESCRIPTION

As part of developing embodiments herein, a problem will first be identified and discussed. LTE will be used as an example of a wireless communications network in which the problem may arise.

As mentioned above if the DRX cycle length or the paging cycle length of the UEs is extended beyond the SFN range, the current procedures of determining the paging occasion are not applicable any more. This is because the current procedures determines one paging occasion per SFN period. In LTE the paging occasion is given by SFN mod T=(T div N)*(UE_ID mod N), where T is the DRX cycle of the UE and N is the minimum of T and nB, where nB is chosen from 4T, 2T, T, T/2, T/4, T/8, T/16, T/32.

Moreover, the SFN is not synchronized across different cells. Thus, if the UE moves to another cell while it is sleeping, the correct wake-up time may not be calculated without turning the UE on to keep track of the current cell and reading the MIB. This is especially a problem if the maximum paging cycle is extended and even in the case the SFN range is extended.

Embodiments herein relate to a DRX cycle length, a paging cycle length and to paging monitoring of wireless communications devices.

An object of embodiments herein is to provide an improved way of determining a time period when the wireless communication device is to monitor for the paging message.

Embodiments herein are described in terms of an LTE network with EPC. Embodiments herein may also be applicable to other cellular and wireless systems as well, such as WCDMA/UMTS.

Embodiments herein present a method which is implemented in a wireless communication device and a core network node. MME is used as an example of the core network node in the following, but generally it may be another node in control of sending a paging message as well. The wireless communication device will be exemplified with a UE. Between the wireless communication device and the core network node there is a base station node, which will schedule the paging messages over the radio link to the wireless communication device. The eNB is used as an example of a base station node in the following.

Figure 1:
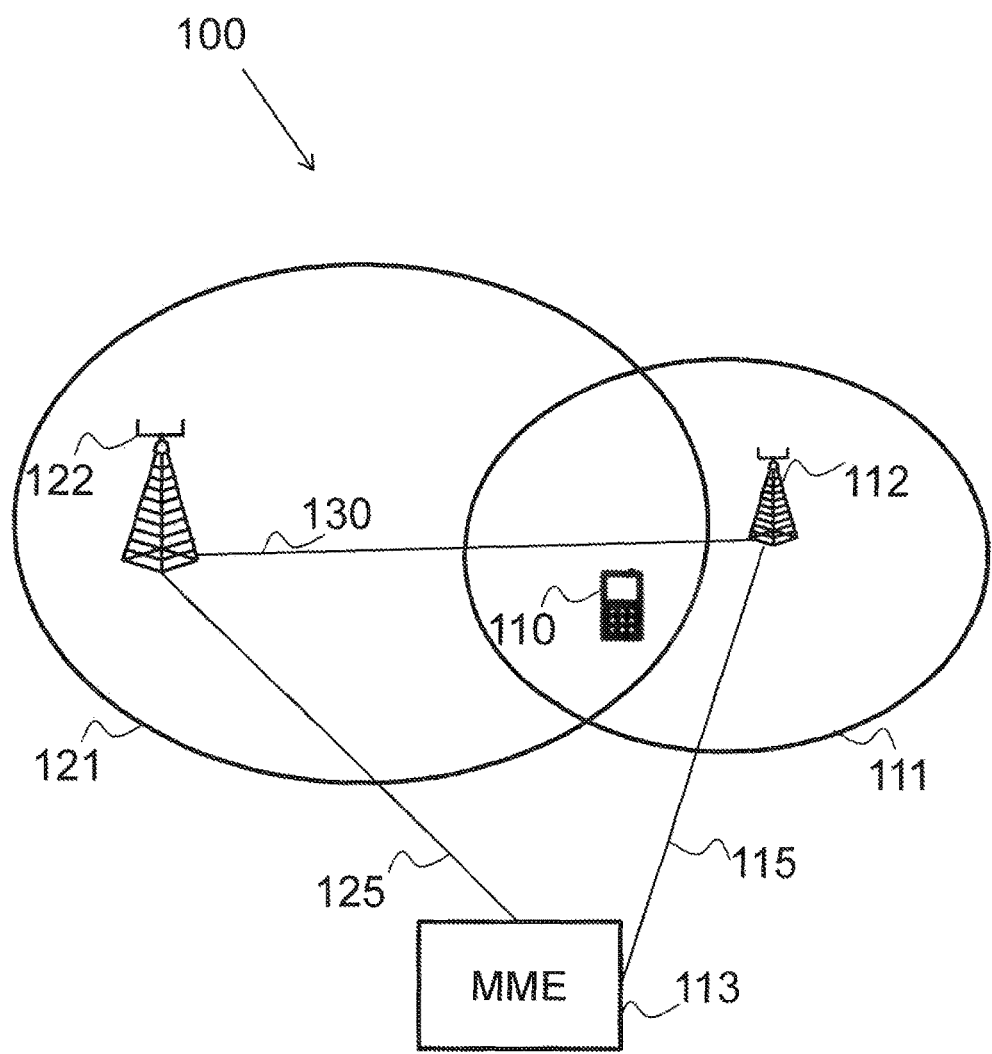
FIG. 1 is a schematic block diagram illustrating embodiments of a wireless communication networks.

Embodiments herein may be implemented in one or more wireless communications networks whereof FIG. 1 depicts parts of a wireless communications network 100 also known as radio communications network, a telecommunications network or similar. The wireless communication network 100 comprises one or more RAN and one or more CN. The wireless communication network 100 may use a number of different technologies, such as Long Term Evolution (LTE), LTE-Advanced, Wideband Code Division Multiple Access (WCDMA), Global System for Mobile communications/Enhanced Data rate for GSM Evolution (GSM/EDGE), Worldwide Interoperability for Microwave Access (WiMax), or Ultra Mobile Broadband (UMB), just to mention a few possible implementations. The wireless communications network 100 is exemplified herein as an LTE network.

The wireless communications network 100 may further be implemented such as any 3GPP wireless communications network, or any cellular wireless communications network or system wherein a core network node sends paging messages to a wireless communications device via a base station.

In the wireless communications network 100, a wireless communication device 110, also known as a mobile station, wireless device, a user equipment and/or a wireless terminal, is capable of communicating via a RAN to one or more CNs. It should be understood by the skilled in the art that "wireless communication device" is a non-limiting term which means any wireless terminal, user equipment, Machine Type Communication (MTC) device, a Device to Device (D2D) terminal, or node e.g. Personal Digital Assistant (PDA), laptop, mobile, sensor, relay, mobile tablets or even a small base station communicating within respective cell.

There may of course be more than one wireless communication device that communicates via the RAN to the one or more CN.

The wireless communication network 100 covers a geographical area which is divided into cell areas, e.g. a cell 111 being served by a radio access node 112, such as a base station. The radio access node 112 may also be referred to as a radio base station and e.g. a NodeB, an evolved Node B (eNB, eNode B), a base transceiver station, Access Point Base Station, base station router, or any other network unit capable of communicating with the wireless communication device 110 within the cell 111 served by the radio access node 112 depending e.g. on the radio access technology and terminology used.

A cell is a geographical area where radio coverage is provided by radio base station equipment at a base station site or at remote locations in Remote Radio Units (RRU). The cell definition may also incorporate frequency bands and radio access technology used for transmissions, which means that two different cells may cover the same geographical area but using different frequency bands. Each cell is identified by an identity within the local radio area, which is broadcast in the cell. Another identity identifying the cell 111 uniquely in the whole wireless communication network 100 is also broadcasted in the cell 111. The radio access node 112 communicates over the air or radio interface operating on radio frequencies with the wireless communication device 110 within range of the radio access node 112. The wireless communication device 110 transmits data over the radio interface to the radio access node 112 in Uplink (UL) transmissions and the radio access node 112 transmits data over an air or radio interface to the wireless communication device 110 in Downlink (DL) transmissions.

The wireless communications network 100 comprises a core network node 113, such as an MME. The wireless communication device 110 communicates with the core network node 113, via the radio access node 112, on matters such as paging.

To facilitate the communication between the radio access node 112 and the core network node 113 the wireless communications network 100 may comprise an interface 115, such as an S1-MME interface.

The wireless communications network 100 may further comprises a second cell 121 being served by a second radio access node 122, such as a second base station. The second radio access node 122 may also be referred to as a radio base station and e.g. a NodeB, an evolved Node B (eNB, eNode B), a base transceiver station, Access Point Base Station, base station router, or any other network unit capable of communicating with the wireless communication device 110 within the second cell 121 served by the second radio access node 122 depending e.g. on the radio access technology and terminology used.

The wireless communication device may 110 communicate with the core network node 113, via the second radio access node 122, on matters such as paging.

To facilitate the communication between the second radio access node 122 and the core network node 113 the wireless communications network 100 may comprise a second interface 125, such as an S1-MME interface.

The radio access node 112 and the second radio access node 122 may communicate with each other. To facilitate the communication between the radio access node 112 and the second radio access node 122 the wireless communications network 100 may comprise a third interface 130, such as an X2 interface.

It should be noted that the following embodiments are not mutually exclusive. Components from one embodiment may be tacitly assumed to be present in another embodiment and it will be obvious to a person skilled in the art how those components may be used in the other exemplary embodiments.

As mentioned above it is beneficial if many of the MTC wireless communication devices, or UEs, try to conserve energy and power by sleeping as much as possible, i.e., having as much of their circuitry turned off as much as possible. Therefore extended paging cycles are desirable.

Actions for handling an extended paging cycle in the wireless communication network 100, according to embodiments herein, will now be described with reference to a combined flowchart and signaling diagram depicted in FIG. 2.

Action 201

In some embodiments the wireless communication device 110 signals to the core network node 113 that it wishes to use extended paging cycles. This may be done in order to trigger the procedure supporting using the extended paging cycle between the wireless communication device 110 and the core network node 113. In this signaling message the wireless communication device 110 may include the exact length of the paging cycle it wishes to use. In an embodiment, the wireless communication device 110 is an LTE UE and uses Non-Access Stratum (NAS) signaling to the MME to configure the extended paging cycles.

This action is related to action 601 and to action 801 below.

Action 202

Figure 2:
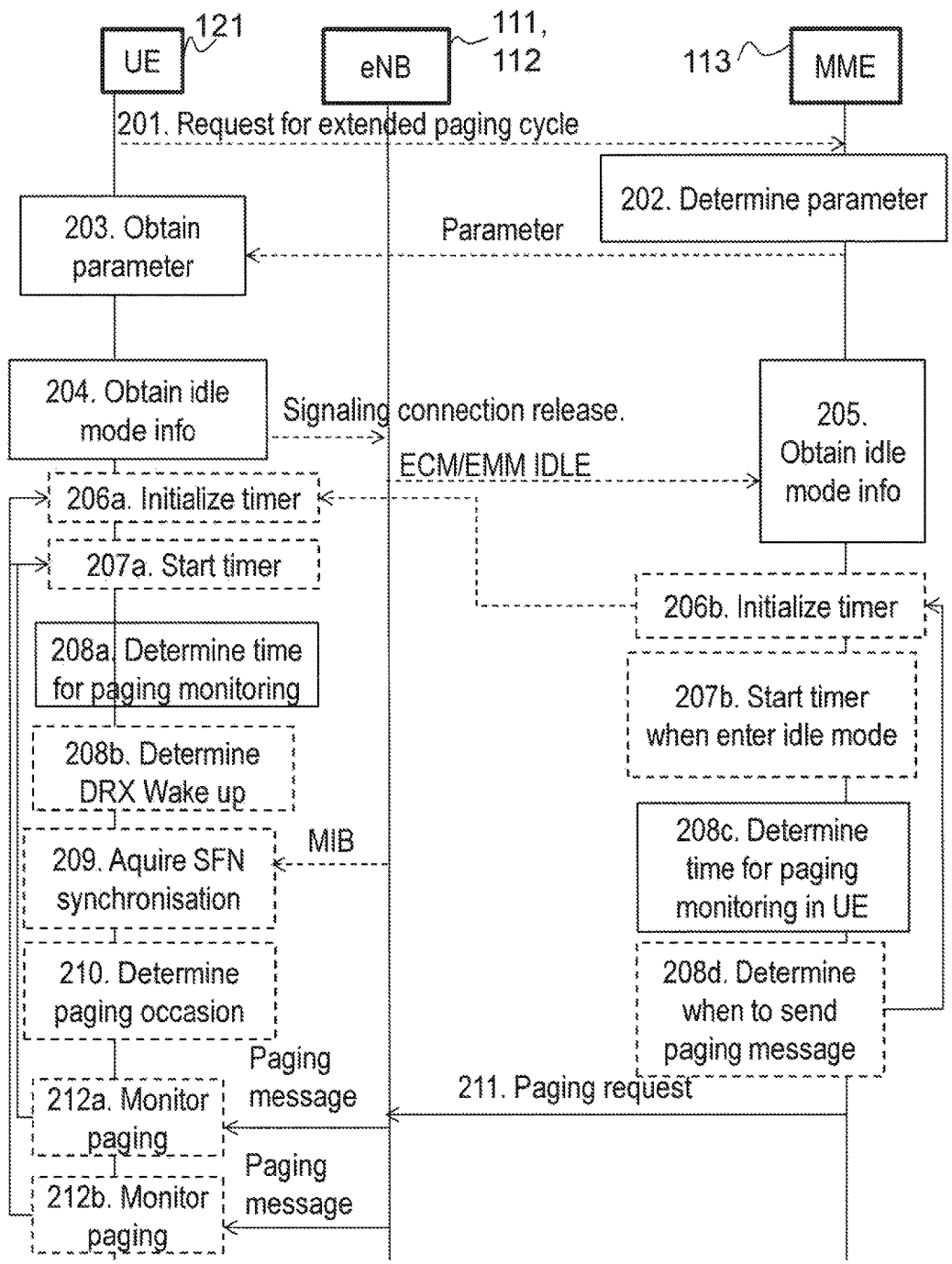
FIG. 2 is a combined flowchart and signaling diagram illustrating embodiments of a method in a wireless communication networks.

If the core network node 113 supports an extended paging cycle and accepts the request from the wireless communication device 110 to use the extended paging cycle, the core network node 113 determines the length of the extended paging cycle, referred to as a parameter in FIG. 2.

The core network node 113 may either use the suggested paging cycle length or override it with its own, or of course decline.

This action is related to action 802.

Action 203

The wireless communications device 110 obtains the parameter related to the length of the extended paging cycle. For example, the wireless communications device 110 may receive the extended paging cycle length from the core network node 113. The core network node 113 may, for example, answer the message sent from the wireless communication device 110 in action 201 above with a message informing the wireless communication device 110 about the extended paging cycle length, $T_{pagingCycle}$.

In some embodiments the message from the core network node 113 comprises a value of a timer related to the extended paging cycle. The timer may be a timer, e.g. $T_{EPaging}$, which indicates the time until the next paging occasion.

In an embodiment $T_{pagingCycle}$ is a time duration value the core network node 113 ends to the wireless communication device 110 in a signaling message. The core network node 113 may take into account the extended paging cycle the wireless communication device 110 would like to use but the decision is up to the core network node 113. In one embodiment the wireless communication device 110 signals its preference in a NAS message and the core network node 113 answers by giving the determined extended paging cycle length to the wireless communication device 110.

In other embodiments the core network node 113 may get the preference of the wireless communication device 110 from the subscription information of the wireless communication device 110, or from another network node, e.g. a Home Subscriber Server (HSS) where the preferences of the wireless communication device 110 are stored.

The core network node 113 may also signal a time period, $T_{sleep}$, during which the wireless communication device 110 shall be in DRX sleep during the paging, to the wireless communication device 110.

The core network node 113 may reject the request to use the extended paging cycle, in which case the wireless communication device 110 may use normal paging cycles. In one embodiment, the core network node 113 rejects by giving the timer $T_{EPaging}$ the value "deactivated". An MME that does not support this functionality will not indicate any timer value back which may be interpreted by the wireless communication device 110 as an indication to use a legacy DRX procedure. In this case, the wireless communication device 110 does not perform the steps below.

This action is related to action 602 and to action 803.

Action 204

The wireless communications device 110 enters idle mode, i.e. idle mode vis-à-vis a connection towards the core network node 113. The connection may for example be a signaling connectivity between the UE and the EPC, and the idle mode may be ECM-IDLE mode. When entering idle mode the wireless communications device 110 obtains an information about when the wireless communication device 110 has entered the idle mode.

The instant in time when the wireless communication device 110 has entered the idle mode is used as a common reference time in the wireless communication device 110 and in the core network node 113 in order to determine the time period when the wireless communication device 110 monitors for the paging message.

This action is related to action 603.

Action 205

The core network node 113 obtains the information about when the wireless communication device 110 has entered the idle mode. The information may be sent from the wireless communications device 110 when the wireless communications device 110 signals connection release, such as ECM-IDLE.

The core network node 113 may store the information about when the wireless communication device 110 has entered the idle mode.

In some embodiments the core network node 113 stores the time when radio access node 112 asks for signaling connection release, i.e. the wireless communication device 110 enters ECM-IDLE.

In some other embodiments the core network node 113 uses an algorithm to further adjust this time based on an estimation of a time the wireless communication device 110 has determined that it has been released to idle. This algorithm may take into account estimated delays in signaling between the radio access node 112 and the wireless communication device 110 and the core network node 113 and the wireless communication device 110 and processing times in the core network node 113, the radio access node 112 and the wireless communication device 110.

The core network node 113 may have separate timers for each of the wireless communication devices with which it communicates. The separate timers are started when the wireless communication devices enter idle mode, i.e. similarly as above.

This action is related to action 804.

Action 206a

The wireless communication device 110 may initialize the timer, for example with the value zero.

In some other embodiment the timer is initialized with the value of the extended paging cycle and the timer is decreased.

This action is related to action 604.

Action 206b

The core network node 113 may also initialize the timer, for example with the value zero.

In some other embodiment the timer is initialized with the value of the extended paging cycle and the timer is decreased.

In some embodiments the core network node 113 initializes and sends to the wireless communication device 110 the timer value $T_{EPaging}$.

In one embodiment, the timer value $T_{EPaging}$ is initialized to 0, and keeps incrementing until the timer reaches it maximum value, e.g. $T_{EPaging,max}$. When the timer reaches it maximum value the wireless communication device 110 may need to reconnect with the core network 113 to synchronize and re-initialize the timer, e.g. to 0. Typically, the maximum value of the timer is set to n×K−1, where n is an integer and K is another integer. Without losing generality, the timer may be recorded digitally as an integer in unit of the SFN range, such as $T_{SFN}$, such that the corresponding analog time is the product of the timer and the SFN range, e.g. $T_{EPaging} \times T_{SFN}$ seconds. Similarly, the maximum value of the timer is an integer with the corresponding analog time (n×K−1)×$T_{SFN}$ seconds.

Action 207a

In some embodiments the wireless communications device 110 starts the timer, such as $T_{EPaging}$, when the wireless communication device 110 has entered the idle mode.

If the wireless communication device 110 sends uplink data and stays in a connected mode for some time after the uplink data transmission, the extended paging cycle timer is not started before the wireless communication device 110 enters idle mode. After the UE enters the idle mode, the extended paging cycle timer can then be started.

If the wireless communication device 110 answers paging or has uplink data it moves to a connected mode where it may follow a different DRX cycle. Upon returning to idle mode it may continue to use extended DRX cycles as configured by the core network node 113. The configuration may be persistent or alternatively the wireless communication device 110 negotiates the paging cycle again with the core network node 113.

When the wireless communication device 110 is in the sleep DRX state, the wireless communication device 110 may keep the timer running. The timer may provide the reference timing for the wireless communication device 110 to wake up to monitor paging. When the wireless communication device 110 sleeps, the functionality of the wireless communication device 110 is similar to the functionality in a power-off state, and the wireless communication device 110 does not perform paging reception.

Figure 3:
FIG. 3 is a schematic block diagram illustrating an extended paging cycle and embodiments herein.

In some embodiments the wireless communication device 110 sleeps for a time duration of $T_{sleep}$ in each extended paging cycle before waking up, as illustrated in FIG. 3.

This action is related to action 605.

Action 207b

The core network node may operate the timer in a similar way as described above in action 207a for the wireless communication device 110.

Action 208a

The wireless communications device 110 determines a time period for monitoring for the paging message. The determining is based on the parameter related to the length of the extended paging cycle and based on the information about when the wireless communication device 110 has entered the idle mode.

This action is related to action 606.

Action 208b

The wireless communication device 110 may determine the time for waking up from DRX sleep.

In some embodiments the wireless communications device 110 wakes up a specific time period, such as $T_{wake}$ milliseconds, before the expected paging occasion. In one example, $T_{wake}$ is in the range of 10-40 milliseconds, which allows the UE to synchronize and/or re-synchronize to the cell in terms of subframe boundary and/or radio frame boundary.

$T_{EPaging}$ may be initialized to take this specific timer period, such as $T_{wake}$, into account explicitly.

This action is related to action 607.

Action 208c

The core network node 113 determines a time period when the wireless communication device 110 is to monitor for the paging message. The determining is based on the length of the extended paging cycle and based on the obtained information about when the wireless communication device 110 has entered the idle mode.

This action is related to action 805.

Action 208d

In some embodiments the core network node 113 determines when to send a paging request message to the radio access node 112. The paging request message comprises the paging message to the wireless communication device 110.

If the core network node 113 wants to page the wireless communication device 110, then based on the length of the extended paging cycle and the stored time value or timer indicating when the wireless communication device 110 entered idle mode, the core network node 113 sends a paging request, comprising the paging message, to the radio access node 112. The sending time may occur a specific time period, e.g., $\Delta_{page}$ ms, before the actual expected wireless communication device 110 paging occasion. The determining of the sending time may take into account or be based on the time to transmit the paging message over S1 to the radio access node 112 and from the radio access node 112 over the radio interface to the wireless communication device 110. The sending time may further take into account a time for processing the paging request at base station.

The determining of the sending time, or $\Delta_{page}$, may be based on for example the SFN range minus a small offset.

This action is related to action 806.

Action 209

The wireless communication device 110 may acquire SFN synchronization to the cell 111. In LTE the wireless communications device 110 reads the Master Information Block (MIB) of the current cell. There may be a separate mechanism or "MTC-MIB" defined in the future for MTC UEs. If the wireless communication device 110 has not changed cells or the internal clock of the wireless communication device 110 has not drifted too much, SFN synchronization may not be needed.

If the wireless communication device 110 is staying in the same cell 111 or in other cells that share the same SFN as the cell 111 as in the case of SFN-synchronized cells, timing of the paging occasion does not change. Here the cell 111 is assumed to be the last cell in which the wireless communication device 110 performed paging reception. Timing of the paging reception is not affected once the wireless communication device 110 wakes up. The radio access node 112 does not need to send the paging message an extra time before the assumed paging occasion.

If the wireless communication device 110 moves to another cell, such as the second cell 121, that does not share the same SFN as the cell 111, timing of the paging occasion changes. The second radio access node 122 may need to repeat the paging message to account for the shifted timing. In one embodiment the Paging request message from the core network node 113 comprises an indication how many repeats the second radio access node 122 should do.

In other embodiments the core network node 113 repeats the sending of Paging request messages until a response is received from the wireless communication device 110.

In some other embodiments the core network node 113 is aware of the SFN timing of the base stations 112, 122. In this case, the core network node 113 may determine a time for the sending of the Paging request messages to wireless communication devices, such as the wireless communication device 110, based on the location of the wireless communication devices in certain cells. In this way the number of repetitions is minimized or no repetitions are needed at all.

This action is related to action 608.

Action 210

In some embodiments the wireless communication device 110 calculates the correct paging occasion as specified. Thus there is no need to change the current calculation of the paging occasion.

The wireless communication device 110 may further sleep before the paging occasion if it may save power, e.g. if the paging occasion is at least several hundred milliseconds in the future. This type of sleep reuses the existing DRX procedure i.e., the shorter sleeping duration within the extended DRX procedure.

This action is related to action 609.

Action 211

The core network node 113 may send the paging request to the radio access node 112. When to send the request may be determined according to action 208d.

Action 212a and 212b

The wireless communication device 110 may listen to possible paging. The wireless communication device 110 may perform legacy paging reception over a time window, which is either defined in the specifications or explicitly signaled from the core network node 113 to the wireless communication device 110. The time window may be defined by giving an explicit time length, or by defining the number of paging repetitions which the wireless communication device 110 listens to. In another embodiment the base station decides the time window and provides this information in the system information read by the wireless communication devices.

If the wireless communication device 110 is not paged continue to action 201 or to action 206a If the wireless communication device 110 is paged the wireless communication device 110 performs the actions required after receiving the paging message.

Note that in-between two adjacent paging receptions, the wireless communication device 110 may sleep as in the existing DRX procedure i.e. similar to what was described in action 210.

These actions are related to action 609.

After action 212a and/or action 212b the wireless communication device 110 may start over from action 201 or alternatively from action 206a if the configuration is persistent.

Further Details of Embodiments

In the following, FIG. 3 illustrates the extended paging cycle during which the wireless communication device 110 may sleep for an extended period of time in each cycle in embodiments herein. For the illustrated 'time window' embodiment in FIG. 3 the Tsleep timer may start at going to Idle as usual, and then be restarted at the end of the time window. The timer in FIG. 3 may be set to Tsleep seconds. In FIG. 3 the paging cycle length is the time interval between the paging occasions. The paging cycle length may vary from time to time, e.g. being Tsleep+a fraction of the DRX cycle, or exactly the DRX cycle. The fraction of the DRX cycle may for example be half the DRX cycle. This is in contrast to current 3GPP specifications, in which the paging cycle, which always equals the DRX cycle in idle mode, is defined by a radio frame during which the wireless communication device 110 listens to paging during specific subframes. The calculation of the paging cycle is specified in TS 36.304 for LTE UEs. For extended DRX a similar definition may be used as well, but the length of the time window needs to be accounted for differently in the calculations in that case. Basically, the wireless communications device 110 and the core network node 113 will only count occasions occurring within the time window. An example of how this may be implemented is depicted in FIG. 4.

Figure 4:
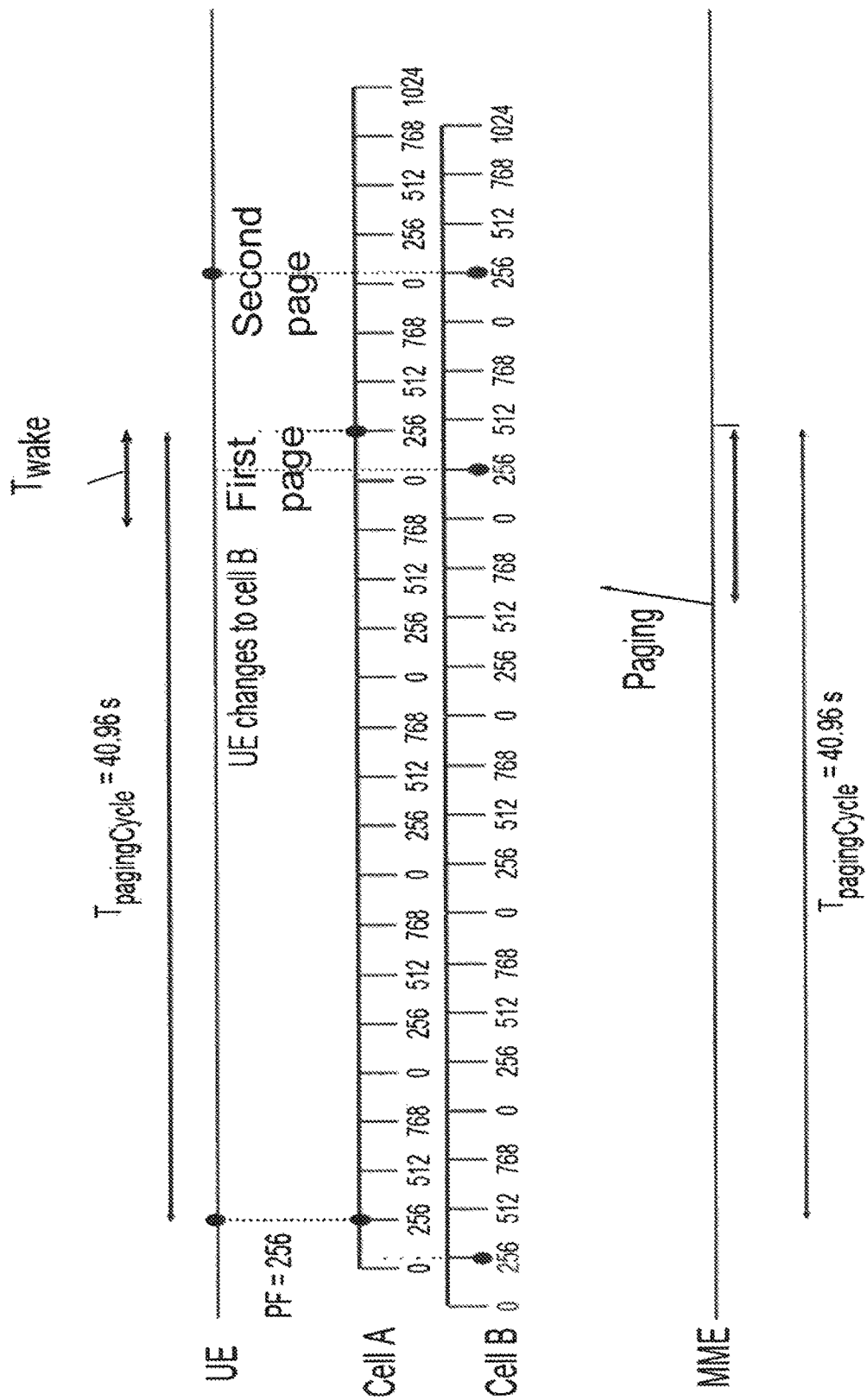
FIG. 4 is a schematic block diagram illustrating further examples of an extended paging cycle and of embodiments herein.

FIG. 4 illustrates the general case of an asynchronous network, where the base stations are not synchronized on the level of subframe boundary or the level of SFN numbering. That is SFN or radio frame numbering is independent in each cell, so, at a specific time instant, cell A in FIG. 4 may have frame number 4 and cell B frame number 345. In a synchronized system the frame number is the same in all cells. Also the boundaries of the radio frames (10 ms blocks) and subframes (1 ms) are not aligned in asynchronous networks.

For a synchronous network, the paging occasions of the cell 111 and the second cell 121 are aligned.

For example, a typical value of the extended paging cycle is an integer multiple of the SFN range. For example, $T_{pagingCycle}=n$, where n is an integer, with the corresponding analog time of $n \times T_{SFN}$ seconds, where $T_{SFN}=10.24$ s is the period, or range, of the SFN. The timer value, such as $T_{EPpaging}$, is used to trigger the sleep and wake timing of the wireless communication device 110. For example the wireless communication device 110 may wake up when a remainder of a division of the timer and the extended paging cycle equals an offset, e.g. when $T_{EPaging}$ mod $T_{pagingCycle} = T_{offset}$.

The horizontal arrow in FIG. 3 schematically illustrates time. In FIG. 3 time periods when the wireless communication device 110 listens to paging are illustrated with filled black rectangles, while the partially filled rectangles illustrate corresponding time periods within an SFN cycle when the wireless communication device 110 does not listen to paging according to embodiments herein. Vertical arrows denote when the radio access node 112 pages the wireless communication device 110.

Without losing generality, in the above the timer and the extended paging cycle may be digitized into integers, in unit of the SFN range, $T_{SFN}$. The offset, $T_{offset}$, may be 0 for simplicity. Alternatively, the offset, $T_{offset}$, may be parameterized by an identification of the wireless communication device 110, such as the UE ID, to spread out the wireless communication devices using the same paging cycle length in time.

The parameters such as the length of the extended paging cycle may be set according to certain properties of the wireless communication device 110. For example, for MTC wireless communication devices that are stationary and latency tolerant, the length of the extended paging cycle may be large, e.g., in the order of hours. In another example, for wireless communication devices that are only active in certain time periods of the day, e.g., MTC wireless communication devices that are electricity meters, the wireless communication device 110 may be configured with a large length of the extended paging cycle during daytime, while configured with a small length of the extended paging cycle during night time.

The wireless communication device 110 and/or the core network node 113 may also adapt the parameter values according to the requirements on downlink reachability of the wireless communication device 110 and/or mobility requirements or history of the wireless communication device 110.

FIG. 4 illustrates an extended paging cycle defined as the time instant between paging frames. In this case the extended paging cycle is 40.96 seconds, which is longer than legacy. Time is indicated by horizontal lines. Further, FIG. 4 illustrates how the wireless communication device 110, such as a UE, first is paged in cell A at PF 256, indicated by the complete dotted line between the timeline of cell A and the timeline of the wireless communication device 110. Then the wireless communication device 110 changes cell to cell B and the wireless communication device 110 is paged in cell B at PF 256, indicated by the complete dotted lines. In cell B two repetitions of the paging by the base station is illustrated. The first page may be missed as the wireless communication device 110 may not be ready for paging, but the wireless communication device 110 captures the second page.

Adding Robustness to Paging

There is a possibility that there is a mismatch between an SFN period the wireless communication device 110 attempts to read paging in and in a period the actual paging message is sent. To counter this problem, it is possible for either the radio access node 112 or the core network node 113 to repeat the paging, e.g. in two or more consecutive SFN periods. This increases resource consumption for paging and causes additional UE power consumption. However, the UE power consumption increase may not be an issue especially if robustness is desired, and the UE may use existing DRX procedure between the two paging occasions.

This was mentioned in action 209 above. The repetitions may be done during a time window, which is either predefined in the specifications or signaled to the UE. The time window may be configured by indicating the length of the time window or a number of paging occasions or frames the UE is expected to listen for. The time window approach may be implemented such that the UE follows a different paging cycle during the time window compared to the extended cycle.

Adding duplicate paging may also result in successful paging when the UE changes cell while sleeping in the case the SFN synchronization between cells, such as the cell 111 and the second cell 121, is totally random, that is, there is no synchronisation at all between cells.

Moreover, in some embodiments the UE may adjust $T_{wake}$ and the core network node 113 may adjust $\Delta_{page}$ for subsequent pages to avoid the SFN period mismatch in subsequent paging occasions.

Figure 5:
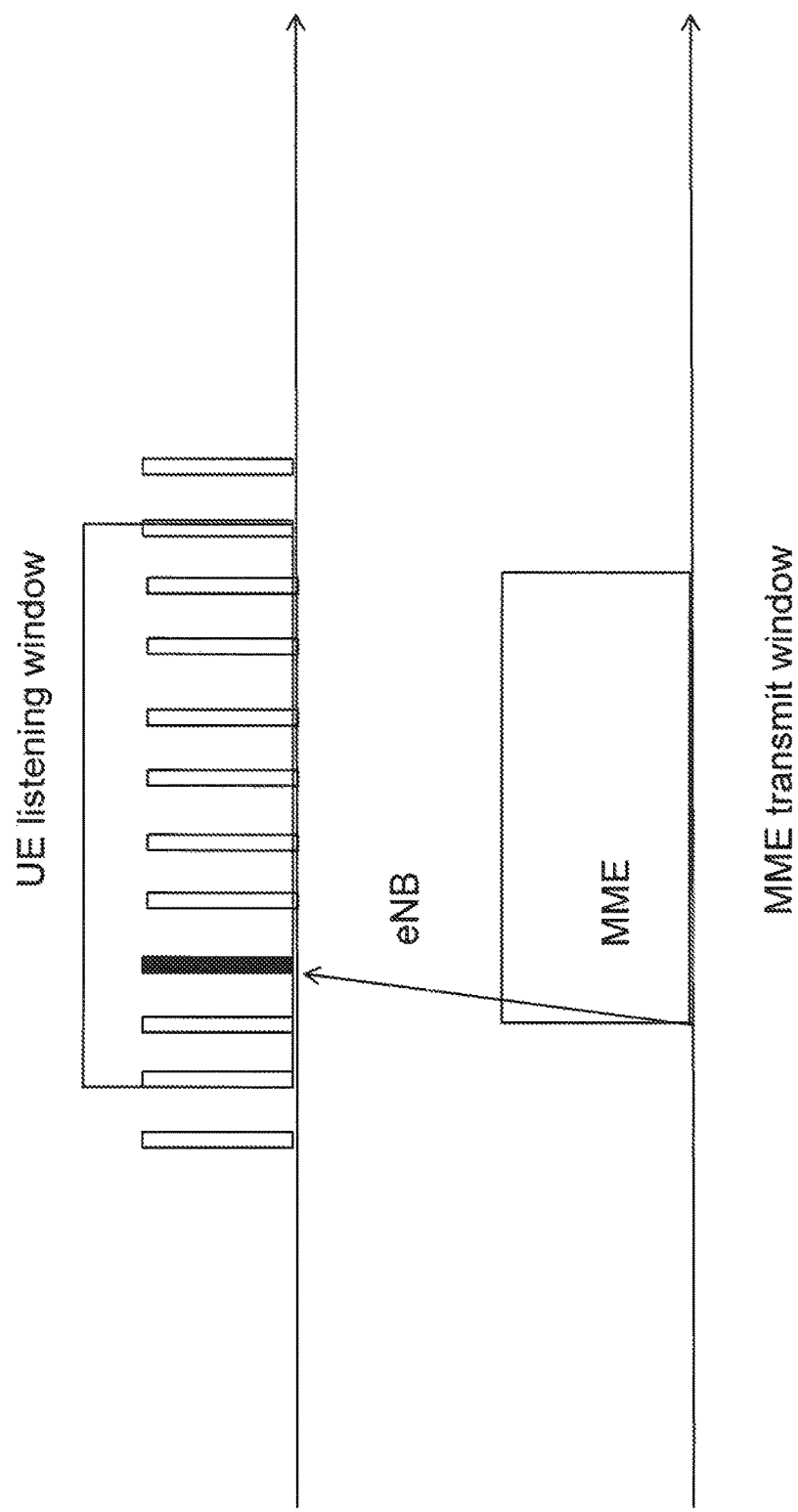
FIG. 5 is a schematic block diagram illustrating further examples of an extended paging cycle and of embodiments herein.

However, in some situations it may be desirable to operate without needing to send extra repetitions of the paging request. FIG. 5 shows a case where the core network node 113 sends the paging request during a time window which is shorter than the time window the UE uses to listen to paging. When the core network node 113 sends the paging message to the radio access node 112 only after the UE window has started, the UE is able to receive the paging message without repeating it.

The role of the radio access node 112 is to receive the paging request message from the core network node 113 and transmit the paging message over radio to the wireless communication device 110. In some embodiments the paging occasion calculation is the same as in existing LTE systems.

The radio access node 112 may repeat the paging message as indicated by the core network node 113, either by number of repetitions or a time window for the base station repetitions.

In some other embodiments the radio access node 112 decides the time window the UE listens to paging and provides this information, e.g., in the system information read by the UE.

In some further embodiments requiring changes to current base station functionality, the radio access node 112 tracks which UEs it has paged and which UEs have responded to the paging message. In this case the base station may stop repeating the paging after the UE response.

Figure 6:
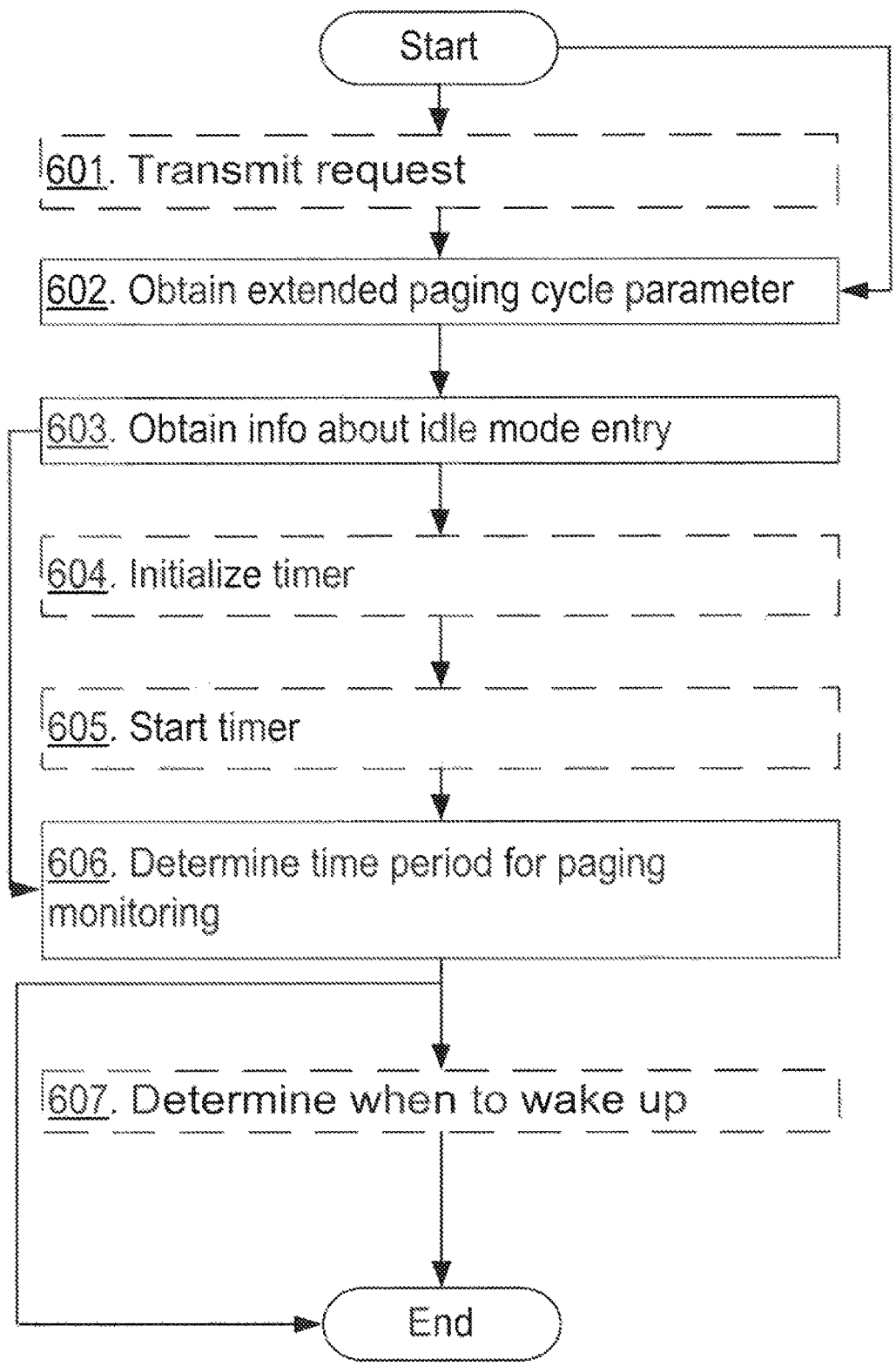
FIG. 6 is a flowchart illustrating embodiments of a method in a wireless communications device.

A method according to embodiments herein will now be described from a perspective of the wireless communications device 110. Thus, embodiments of a method in the wireless communications device 110 for handling the extended paging cycle will be described with reference to a flowchart depicted in FIG. 6. As mentioned above, the extended paging cycle is longer than a frame number range of the wireless communications network 100. The extended paging cycle may for example be longer than the SFN range.

The method comprises the following actions, which actions may be taken in any suitable order.

Action 601

In some embodiments the wireless communication device 110 signals to the CN that it wishes to use extended paging cycles. Thus the wireless communications device 110 may transmit the request to use the extended paging cycle to the core network node 113.

This action is related to action 201 and to action 801.

Action 602

The wireless communications device 110 obtains a parameter related to the length of the extended paging cycle. For example, the core network node 113 may provide the wireless communication device 110 with the extended paging cycle length, for example by answering the wireless communication device 110 with a message informing the wireless communication device 110 about the extended paging cycle length, $T_{pagingCycle}$.

This action is related to action 202 and to action 803.

Action 603

The wireless communications device 110 obtains the information about when the wireless communication device 110 has entered the idle mode, which idle mode is related to the connection between the wireless communication device 110 and the core network node 113. An instant in time related to when the wireless communication device 110 enters the idle mode is used as a common reference time in the wireless communication device 110 and in the core network node 113 in order to determine the time period when the wireless communication device 110 monitors for the paging message.

In some embodiments the instant in time related to when the wireless communication device 110 enters the idle mode is an instant in time when the wireless communication device 110 enters the idle mode.

In some other embodiments the instant in time related to when the wireless communication device 110 enters the idle mode is an instant in time related to a last activity and/or a last transmission of the wireless communication device 110.

This action is related to action 204.

Action 604

The wireless communications device 110 may initialize a timer related to the extended paging cycle. The wireless communications device 110 may use the timer to keep track of the time lapsed from the instant when the wireless communication device 110 entered the idle mode. Later the timer may also be used to keep track of the time lapsed from the instant when the wireless communication device 110 has monitored a paging message.

The timer may be used together with the parameter related to the length of the extended paging cycle to determine when to monitor for paging messages. For example, the timer may be compared to the length of the extended paging cycle, or initialized with the length of the extended paging cycle.

The timer may be provided from the core network node 113, for example comprised in the message informing the wireless communication device 110 about the extended paging cycle length.

In some embodiments the wireless communications device 110 may obtain the timer from subscription data.

This action is related to action 206a.

Action 605

When the wireless communications device 110 uses the timer, the wireless communications device 110 starts the timer. The wireless communications device 110 may start the timer the first time when entering idle mode.

In some other embodiments the wireless communications device 110 starts the timer the first time due to the last activity and/or the last transmission of the wireless communication device 110.

After receiving a paging message the wireless communications device 110 may re-initialize and re-start the timer.

If the wireless communications device 111 is not able to decode the paging message, for example if it is in bad coverage, the wireless communications device 111 may also then re-start the timer.

This action is related to action 207a.

Action 606

The wireless communications device 110 determines a time period when the wireless communication device 110 is to monitor for the paging message. The determining is based on the parameter related to the length of the extended paging cycle, e.g. the length of the extended paging cycle. The determining is further based on the information about when the wireless communication device 110 has entered the idle mode.

Since the determining of the time period when the wireless communication device 110 is to monitor for the paging message is based on the parameter related to the length of the extended paging cycle and the information about when the wireless communication device 110 has entered the idle mode the wireless communications device 110 is able to handle the extended paging cycle.

Since the core network node 113 determines the time period when the wireless communication device 110 is to monitor for the paging message in a similar way the core network node 113 is also able to handle the extended paging cycle.

Since the wireless communications device 110 and the core network node 113 determines the time period when the wireless communication device 110 is to monitor for the paging message in a similar way the risk that the wireless communications device 110 misses a paging message is minimized.

In some embodiments the time period when the wireless communication device 110 is to monitor for the paging message comprises a first time period and a second time period. In these embodiments the wireless communication device 110 is to monitor for the paging message a first time in the first time period. In these embodiments the wireless communication device 110 is further to monitor for the paging message a second time in the second time period.

The determining of the second time period may be based on a length of a second paging cycle and on any one or more out of: the information about when the wireless communication device 110 has entered the idle mode, and the timer. The second paging cycle is shorter than the extended paging cycle.

This action is related to action 208a.

Action 607

In some embodiments the wireless communications device 110 determines an instant in time when to wake up from a sleep state in discontinuous reception. The determining the instant in time when to wake up from the sleep state is based on the parameter related to the length of the extended paging cycle. The determining the instant in time when to wake up from the sleep state is further based on any one or more out of: the information about when the wireless communication device 110 has entered the idle mode, and the timer.

The determining the instant in time when to wake up from the sleep state in discontinuous reception may further be based on whether the time period during which the wireless communication device 110 is expected to monitor for the paging message comprises the first time period and/or the second time period.

This action is related to action 208b.

Figure 7:
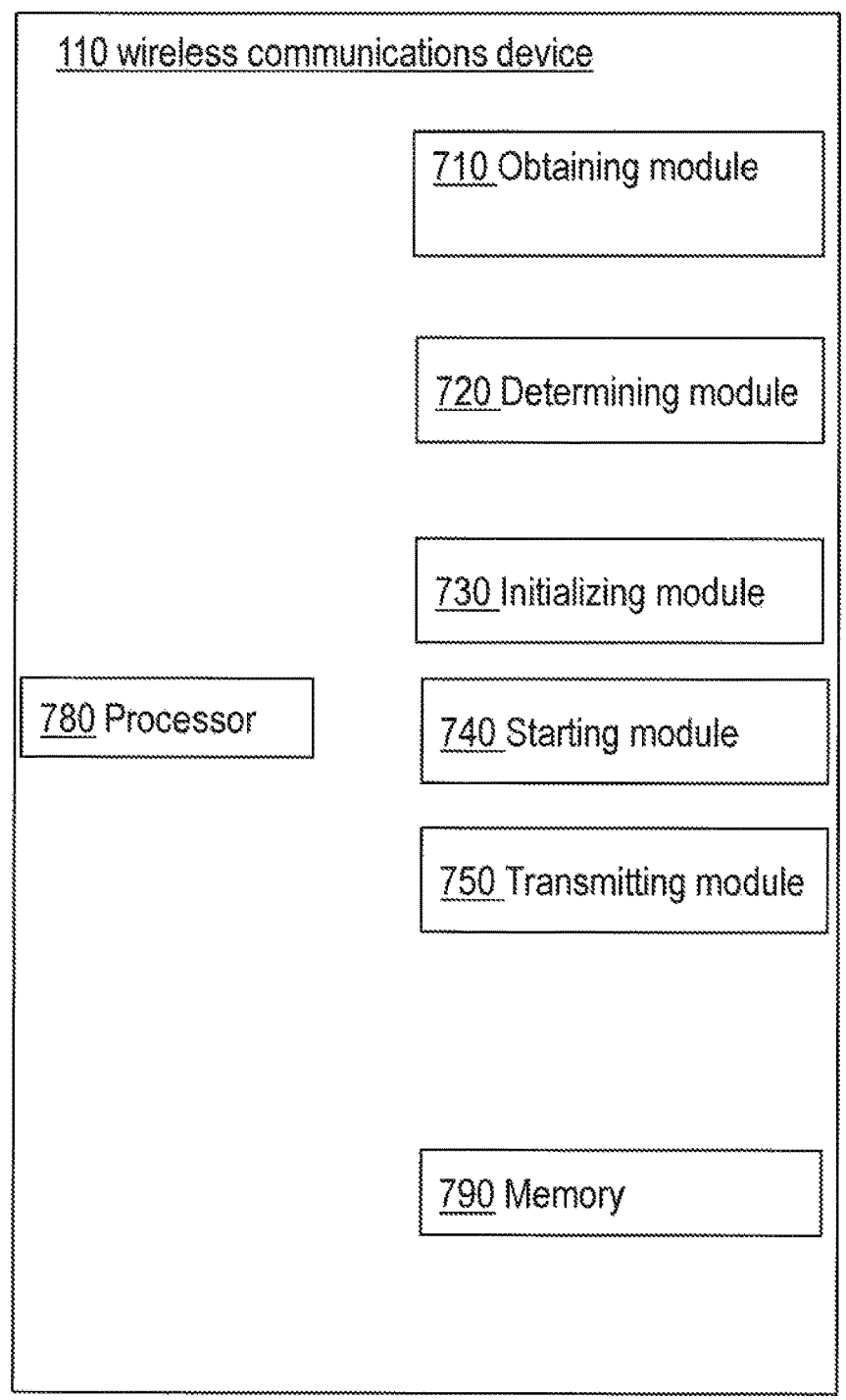
FIG. 7 is a schematic block diagram illustrating embodiments of a wireless communications device.

In order to perform the methods disclosed herein a wireless communication device 110 is provided, depicted in FIG. 7. The wireless communication device 110 is configured to handle the extended paging cycle.

As mentioned above the extended paging cycle is longer than a frame number range of the wireless communications network 100. The extended paging cycle may for example be longer than the SFN range.

The wireless communication device 110 is configured to, e.g. by means of an obtaining module 710 configured to, obtain a parameter related to the length of the extended paging cycle.

The obtaining module 710 may be implemented by a receiver in the wireless communication device 110.

The wireless communication device 110 is further configured to, e.g. by means of the obtaining module 710 configured to, obtain an information about when the wireless communication device 110 has entered the idle mode. The idle mode is related to a connection between the wireless communication device 110 and the core network node 113.

In this case the obtaining module 710 may be implemented by a processor 780 in the wireless communication device 110.

The wireless communication device 110 is further configured to, e.g. by means of a determining module 720 configured to, determine a time period when the wireless communication device 110 is to monitor for the paging message. The wireless communication device 110 is further configured to determine the time period based on the parameter related to the length of the extended paging cycle and based on the information about when the wireless communication device 110 has entered the idle mode. This enables the wireless communication device 110 to handle the extended paging cycle.

In some embodiments the time period when the wireless communication device 110 is to monitor for the paging message comprises the first time period and the second time period. The wireless communication device 110 is configured to monitor for the paging message the first time in the first time period. The wireless communication device 110 is configured to monitor for the paging message the second time in the second time period.

The wireless communication device may further be configured to determine the second time period based on the length of the second paging cycle and on any one or more out of: the information about when the wireless communication device 110 has entered the idle mode, and the timer. The second paging cycle is shorter than the extended paging cycle.

The determining module 720 may be implemented by the processor 780 in the wireless communication device 110.

The wireless communication device 110 may further be configured to, e.g. by means of an initializing module 730 configured to, initialize a timer related to the extended paging cycle.

The initializing module 730 may be implemented by the processor 780 in the wireless communication device 110.

When the wireless communication device 110 is configured to initialize the timer the wireless communication device 110 is further configured to, e.g. by means of a starting module 740 configured to, start the timer. The wireless communication device 110 is configured to start the timer a first time when entering idle mode.

The starting module 740 may be implemented by the processor 780 in the wireless communication device 110.

In some embodiments the wireless communication device 110 is further configured to, e.g. by means of the determining module 720 configured to, determine an instant in time when to wake up from a sleep state in discontinuous reception. The wireless communication device 110 is further configured to determine the instant in time when to wake up from the sleep state based on:

the parameter related to the length of the extended paging cycle, and on any one or more out of:
the information about when the wireless communication device 110 has entered the idle mode, and the timer.

The wireless communication device 110 may further be configured to determine the instant in time when to wake up from the sleep state based on whether the time period during which the wireless communication device 110 is to monitor for the paging message comprises the first time period and/or the second time period.

When the wireless communication device 110 is further configured to, e.g. by means of a transmitting module 750 configured to, transmit a request to the core network node 113, which request requests to use the extended paging cycle.

The transmitting module 750 may be implemented by a transmitter in the wireless communication device 110.

The embodiments herein to handle an extended paging cycle and determine the time period when the wireless communication device 110 is to monitor for the paging message may be implemented through one or more processors, such as the processor 780 in the wireless communication device 110 depicted in FIG. 7, together with computer program code for performing the functions and actions of the embodiments herein. The program code mentioned above may also be provided as a computer program product, for instance in the form of a data carrier carrying computer program code for performing the embodiments herein when being loaded into the wireless communication device 110. One such carrier may be in the form of a CD ROM disc. It is however feasible with other data carriers such as a memory stick. The computer program code may furthermore be provided as pure program code on a server and downloaded to the wireless communication device 110.

Thus, the methods according to the embodiments described herein for the wireless communication device 110 may be implemented by means of a computer program product, comprising instructions, i.e., software code portions, which, when executed on at least one processor, cause the at least one processor to carry out the actions described herein, as performed by the wireless communication device 110. The computer program product may be stored on a computer-readable storage medium. The computer-readable storage medium, having stored there on the computer program, may comprise the instructions which, when executed on at least one processor, cause the at least one processor to carry out the actions described herein, as performed by the wireless communication device 110. In some embodiments, the computer-readable storage medium may be a non-transitory computer-readable storage medium.

Those skilled in the art will also appreciate that the obtaining module 710, the determining module 720, the initializing module 730, the starting module 740 and the transmitting module 750 described above may refer to a combination of analogue and digital circuits, and/or one or more processors configured with software and/or firmware, e.g. stored in a memory 790, that when executed by the one or more processors such as the processor 780 perform as described above. One or more of these processors, as well as the other digital hardware, may be included in a single Application-Specific Integrated Circuit (ASIC), or several processors and various digital hardware may be distributed among several separate components, whether individually packaged or assembled into a System-on-a-Chip (SoC).

Figure 8:
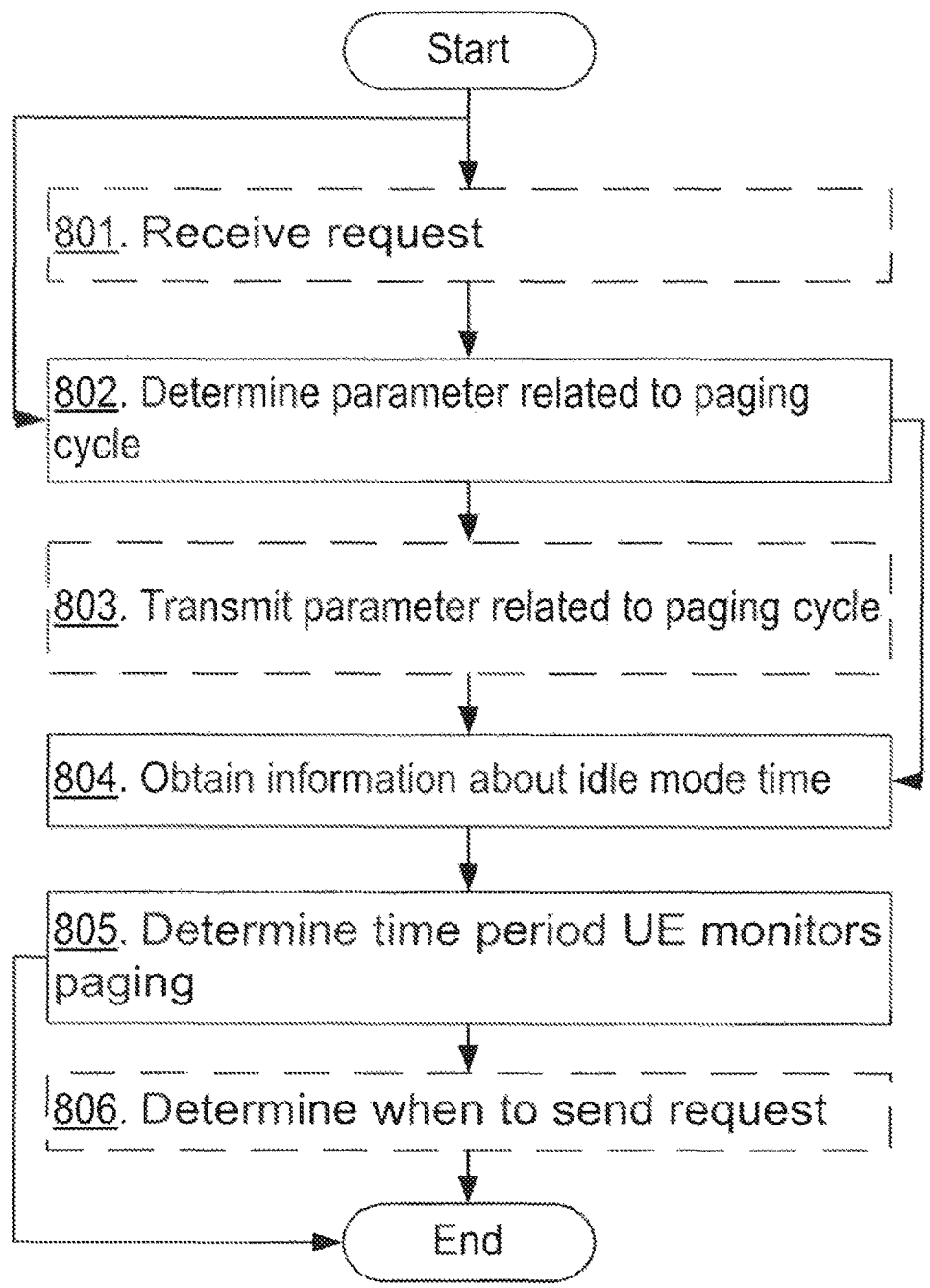
FIG. 8 is a flowchart illustrating embodiments of a method in a core network node.

A method according to embodiments herein will now be described from a perspective of the core network node 113. Thus, embodiments of a method in the wireless communications device 110 for handling the extended paging cycle will be described with reference to a flowchart depicted in FIG. 8. As mentioned above, the extended paging cycle is longer than a frame number range of the wireless communications network 100. The extended paging cycle may for example be longer than the SFN range.

The method comprises the following actions, which actions may be taken in any suitable order.

Action 801

In some embodiments the core network node 113 receives a request to use the extended paging cycle, from the wireless communication device 110.

This action is related to action 201 and 601.

Action 802

The core network node 113 determines a parameter related to the length of the extended paging cycle. For example, the wireless communications device 110 determines the length of the extended paging cycle.

This action is related to action 202.

Action 803

The core network node 113 may transmit the parameter related to the length of the extended paging cycle to the wireless communication device 110.

This action is related to action 204.

Action 804

The core network node 113 obtains information about when the wireless communication device 110 has entered an idle mode. The idle mode is related to the connection between the wireless communication device 110 and the core network node 113.

This action is related to action 205.

Action 805

The core network node 113 determines a time period when the wireless communication device 110 is to monitor for the paging message, based on the parameter related to the length of the extended paging cycle and based on the obtained information about when the wireless communication device 110 has entered the idle mode. This enables the core network node 113 to handle the extended paging cycle.

This action is related to action 208c.

Action 806

In some embodiments the core network node 113 determines a third time period based on the length of the extended paging cycle and based on the stored information about when the wireless communication device 110 enters the idle mode. The third time period is related to when to send a paging request message to a radio access node 111, 112. The paging request message comprises the paging message to the wireless communication device 110.

The determining the time period when the wireless communication device 110 is to monitor for the paging message may comprise determining:

a first start time related to the time period during which the wireless communication device 110 is to monitor for the paging message, and a first stop time related to the time period during which the wireless communication device 110 is to monitor for the paging message.

Determining the third time period may comprise determining a second start time related to the third time period, and a second stop time related to the third time period.

In some embodiments the first start time is earlier than the second start time, and the first stop time is later than the second stop time. By determining the time periods in this way the core network node 113 doesn't need to repeat the paging message since the time period during which the wireless communication device 110 is to monitor for the paging message comprises the third time period, during which third time period the core network node sends a paging request message to the radio access node 112.

The paging request message may comprise an indication to the radio access node 111, 112 to repeat the paging message to the wireless communication device 110.

In some embodiments the paging request message to the radio access node 111, 112 is repeated.

In some other embodiments the paging request message to the radio access node 111, 112 is repeated until a response to the paging message is received from the wireless communication device 110.

The third time period may further be based on whether the paging request message to the radio access node 111, 112 is to be repeated. In this way the core network node 113 may adjust the third time period if the first message was missed.

This action is related to action 208d.

Figure 9:
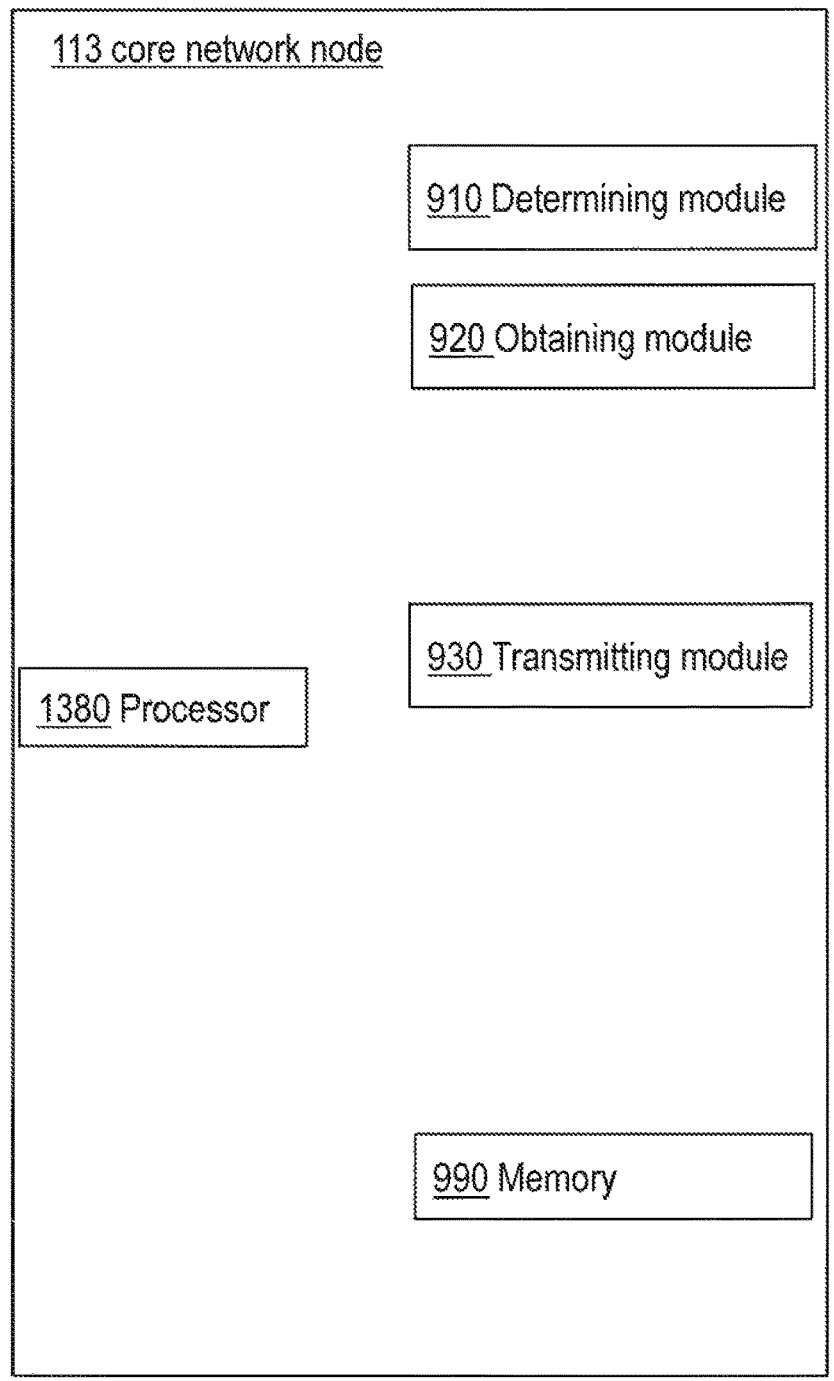
FIG. 9 is a schematic block diagram illustrating embodiments of a core network node.

In order to perform the methods disclosed herein a core network node 113, depicted in FIG. 9, is provided. The core network node 113 is configured to handle the extended paging cycle.

As mentioned above the extended paging cycle is longer than a frame number range of the wireless communications network 100. The extended paging cycle may for example be longer than the SFN range.

The core network node 113 is configured to, e.g. by means of a determining module 910 configured to, determine a parameter related to a length of the extended paging cycle.

The determining module 910 may be implemented by a processor 980 in the core network node 113.

The core network node 113 is further configured to, e.g. by means of an obtaining module 920 configured to, obtain information about when the wireless communication device 110 has entered an idle mode. The idle mode is related to a connection between the wireless communication device 110 and the core network node 113.

The obtaining module 920 may be implemented by a receiver in the core network node 113.

The core network node 113 is further configured to, e.g. by means of the determining module 910 configured to, determine a time period when the wireless communication device 110 is to monitor for the paging message, based on the parameter related to the length of the extended paging cycle and based on the obtained information about when the wireless communication device 110 has entered the idle mode. This enables the core network node 113 to handle the extended paging cycle.

The core network node 113 may further be configured to, e.g. by means of the determining module 910 configured to, determine a third time period based on the length of the extended paging cycle and based on the stored information about when the wireless communication device 110 enters the idle mode. The third time period is related to when to send a paging request message to the radio access node 111, 112. The paging request message comprises the paging message to the wireless communication device 110.

The core network node 113 may be configured to determine the third time period further based on whether the paging request message to the radio access node 111, 112 is to be repeated.

The paging request message may comprise an indication to the radio access node 111, 112 to repeat the paging message to the wireless communication device 110.

In some embodiments the core network node 113 is configured to repeat the paging request message to the radio access node 111, 112.

The core network node may be configured to repeat the paging request message to the radio access node 111, 112 until a response to the paging message is received from the wireless communication device 110.

The core network node 113 may further be configured to, e.g. by means of the determining module 910 configured to, determine the time period when the wireless communication device 110 is to monitor for the paging message by determining a first start time related to the time period during which the wireless communication device 110 is to monitor for the paging message, and a first stop time related to the time period during which the wireless communication device 110 is to monitor for the paging message. Then the core network node 113 is further configured to determine the third time period by determining a second start time related to the third time period, and a second stop time related to the third time period. The first start time is earlier than the second start time, and the first stop time is later than the second stop time.

The core network node 113 may further be configured to, e.g. by means of the obtaining module 920 configured to, receive a request to use the extended paging cycle, from the wireless communication device 110.

When the core network node 113 is further configured to, e.g. by means of a transmitting module 930 configured to, transmit the parameter related to the length of the extended paging cycle to the wireless communication device 110.

The transmitting module 930 may be implemented by a transmitter in the core network node 113.

The embodiments herein to handle an extended paging cycle and determine the time period when the wireless communication device 110 is to monitor for the paging message may be implemented through one or more processors, such as the processor 980 in the core network node 113 depicted in FIG. 9, together with computer program code for performing the functions and actions of the embodiments herein. The program code mentioned above may also be provided as a computer program product, for instance in the form of a data carrier carrying computer program code for performing the embodiments herein when being loaded into the core network node 113. One such carrier may be in the form of a CD ROM disc. It is however feasible with other data carriers such as a memory stick. The computer program code may furthermore be provided as pure program code on a server and downloaded to the core network node 113.

Thus, the methods according to the embodiments described herein for the core network node 113 may be implemented by means of a computer program product, comprising instructions, i.e., software code portions, which, when executed on at least one processor, cause the at least one processor to carry out the actions described herein, as performed by the core network node 113. The computer program product may be stored on a computer-readable storage medium. The computer-readable storage medium, having stored there on the computer program, may comprise the instructions which, when executed on at least one processor, cause the at least one processor to carry out the actions described herein, as performed by the wireless communication device 110. In some embodiments, the computer-readable storage medium may be a non-transitory computer-readable storage medium.

Those skilled in the art will also appreciate that the determining module 910, the obtaining module 920, and the transmitting module 930 described above may refer to a combination of analogue and digital circuits, and/or one or more processors configured with software and/or firmware, e.g. stored in a memory 990, that when executed by the one or more processors such as the processor 980 perform as described above. One or more of these processors, as well as the other digital hardware, may be included in a single Application-Specific Integrated Circuit (ASIC), or several processors and various digital hardware may be distributed among several separate components, whether individually packaged or assembled into a System-on-a-Chip (SoC).

An advantage with embodiments herein is that they support paging for wireless communication devices which follow longer paging cycles without impacting the paging message transmission on the radio access network.

Longer paging cycles enable significant power saving gains for wireless communication devices, such as UEs.

A further advantage is that the current method of calculating the paging occasion may be used, when the UE is awake, e.g. at expiration of the timer. The current form of the SFN numbering may be used, and the SFN range does not need to be extended.

Yet another advantage is that the wireless communication devices may be paged on different cells which do not have synchronized SFN, since the wireless communication device and the core network node keep track of the timing until next paging.

A further advantage is that the embodiments in the wireless communication device and the core network node are transparent to the radio access node.

When using the word "comprise" or "comprising" it shall be interpreted as non-limiting, i.e. meaning "consist at least of".

Modifications and other embodiments of the disclosed embodiments will come to mind to one skilled in the art having the benefit of the teachings presented in the foregoing descriptions and the associated drawings. Therefore, it is to be understood that the embodiment(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

Therefore, the above embodiments should not be taken as limiting the scope, which is defined by the appending claims.

Note that although terminology from 3GPP LTE/SAE has been used in this disclosure to exemplify the embodiments herein, this should not be seen as limiting the scope of the embodiments herein to only the aforementioned system. Other wireless systems may also benefit from exploiting the ideas covered within this disclosure.

Also note that terminology such as a first network node and a second network node should be considered to be non-limiting and does in particular not imply a certain hierarchical relation between the two.

The invention claimed is:

1. A method in a wireless communication device for handling an extended paging cycle, the extended paging cycle being used for receiving a paging message from a core network node comprised in a wireless communications network, and the extended paging cycle being longer than a frame number range of the wireless communications network, the method comprising:

obtaining a parameter related to a length of the extended paging cycle;

obtaining an information about when the wireless communication device has entered an idle mode, the idle mode being related to a connection between the wireless communication device and the core network node; and determining a time period when the wireless communication device is to monitor for the paging message, the determining being based on the parameter related to the length of the extended paging cycle and based on the information about when the wireless communication device has entered the idle mode, wherein the time period when the wireless communication device is to monitor for the paging message comprises a first time period and a second time period, wherein the second time period is determined based on a length of a second paging cycle, where the second paging cycle is shorter than the extended paging cycle, and on the information about when the wireless communication device has entered the idle mode.

2. The method according to claim 1, further comprising: initializing a timer related to the extended paging cycle; and starting the timer a first time when entering the idle mode.

3. The method according to claim 2, further comprising: determining an instant in time when to wake up from a sleep state in discontinuous reception, wherein determining the instant in time is based on: the parameter related to the length of the extended paging cycle, and on at least one of: the information about when the wireless communication device has entered the idle mode; and the timer.

4. The method according to claim 1, further comprising monitoring for the paging message a first time in the first time period, and monitoring for the paging message a second time in the second time period.

5. The method according to claim 1, further comprising: transmitting a request to the core network node, the request requesting to use the extended paging cycle.

6. The method according to claim 3, wherein the determining the instant in time when to wake up from the sleep state in discontinuous reception is based on whether the time period during which the wireless communication device is to monitor for the paging message comprises at least one of the first time period and the second time period.

7. The method according to claim 1, wherein the extended paging cycle is longer than a System Frame Number, SFN, range.

8. The method according to claim 2, further comprising: determining an instant in time when to wake up from a sleep state in discontinuous reception, wherein determining the instant in time is based on the parameter related to the length of the extended paging cycle.

9. A wireless communication device configured to handle an extended paging cycle, the extended paging cycle being used for receiving a paging message from a core network node comprised in a wireless communications network, and the extended paging cycle being longer than a frame number range of the wireless communications network, the wireless communication device being configured to:

obtain a parameter related to a length of the extended paging cycle;

obtain an information about when the wireless communication device has entered an idle mode, the idle mode being related to a connection between the wireless communication device and the core network node; and determine a time period when the wireless communication device is to monitor for the paging message, the determining being based on the parameter related to the length of the extended paging cycle and based on the information about when the wireless communication device has entered the idle mode, wherein the time period when the wireless communication device is to monitor for the paging message comprises a first time period and a second time period, wherein the second time period is determined based on a length of a second paging cycle, where the second paging cycle is shorter than the extended paging cycle, and on the information about when the wireless communication device has entered the idle mode.

10. The wireless communication device according to claim 9, further configured to: initialize a timer related to the extended paging cycle; and start the timer a first time when entering the idle mode.

11. The wireless communication device according to claim 10, further configured to: determine an instant in time when to wake up from a sleep state in discontinuous reception based on: the parameter related to the length of the extended paging cycle, and on at least one of: the information about when the wireless communication device has entered the idle mode; and the timer.

12. The wireless communication device according to claim 9, wherein the wireless communication device monitors for the paging message a first time in the first time period, and the wireless communication device monitors for the paging message a second time in the second time period.

13. The wireless communication device according to claim 9, further configured to transmit a request to the core network node, the request requesting to use the extended paging cycle.

14. The wireless communication device according to claim 11, further configured to determine the instant in time when to wake up from the sleep state in discontinuous reception based on whether the time period during which the wireless communication device is to monitor for the paging message comprises at least one of the first time period and the second time period.

15. The wireless communication device according to claim 9, wherein the extended paging cycle is longer than a System Frame Number, SFN, range.

16. The wireless communication device according to claim 10, further configured to: determine an instant in time when to wake up from a sleep state in discontinuous reception based on the parameter related to the length of the extended paging cycle.

* * * * *